(12) United States Patent
Azar et al.

(10) Patent No.: US 11,793,188 B1
(45) Date of Patent: Oct. 24, 2023

(54) SYSTEMS AND METHODS FOR DISTRIBUTING GRANULAR MATERIALS

(71) Applicant: Razar Management LLC, San Antonio, TX (US)

(72) Inventors: Robert E. Azar, Driftwood, TX (US); Victor A. Mireles, El Paso, TX (US)

(73) Assignee: RAZAR INDUSTRIES LLC, San Antonio, TX (US)

( * ) Notice: Subject to any disclaimer, the term of this patent is extended or adjusted under 35 U.S.C. 154(b) by 358 days.

(21) Appl. No.: 16/863,121

(22) Filed: Apr. 30, 2020

Related U.S. Application Data

(63) Continuation of application No. 15/870,931, filed on Jan. 13, 2018, now abandoned.

(60) Provisional application No. 62/446,725, filed on Jan. 16, 2017.

(51) Int. Cl.
*A01M 9/00* (2006.01)
*A01M 99/00* (2006.01)
*A01N 25/12* (2006.01)

(52) U.S. Cl.
CPC .......... *A01M 9/0069* (2013.01); *A01M 9/0092* (2013.01); *A01M 99/00* (2013.01); *A01N 25/12* (2013.01); *A01M 2200/011* (2013.01)

(58) Field of Classification Search
CPC .............. A01M 1/2011; A01M 9/0053; A01M 9/0069; A01M 9/0076; A01M 9/0092; A01M 25/006; A01M 2200/011; A01M 99/00; A01N 25/12
See application file for complete search history.

(56) References Cited

U.S. PATENT DOCUMENTS

| | | | | |
|---|---|---|---|---|
| 1,856,809 | A * | 5/1932 | Gibson et al. | A01M 25/006 43/124 |
| 2,390,686 | A * | 12/1945 | Bishop | A01M 25/006 111/95 |
| 2,783,581 | A * | 3/1957 | Lee | A01M 25/006 111/95 |
| 3,070,263 | A * | 12/1962 | McMullen | A01M 9/0092 222/215 |
| 3,589,560 | A * | 6/1971 | Wilcox | A01M 17/002 222/246 |

(Continued)

*Primary Examiner* — Darren W Gorman
(74) *Attorney, Agent, or Firm* — Sprinkle IP Law Group

(57) ABSTRACT

Systems and methods for dispensing measured amounts of a granular material, wherein one embodiment is a dispensing apparatus having a dispensing body, a handle and a handle extension coupled between the handle and the dispensing body. The dispensing body has a measuring container with a cavity of known volume, as well as a filling mechanism and a dispensing mechanism. The filling mechanism is selectively activated to fill the cavity of the measuring container with the granular material, and the dispensing mechanism is selectively activated to release the granular material from the cavity to dispense only the predetermined amount of the granular material that fills the cavity of the measuring container from the apparatus. A trigger on the handle is coupled to the filling mechanism and the dispensing mechanism via a linkage in the handle extension, and activation of the trigger selectively activates the filling mechanism and the dispensing mechanism.

15 Claims, 4 Drawing Sheets

(56) References Cited

U.S. PATENT DOCUMENTS

| | | | | |
|---|---|---|---|---|
| 3,771,474 | A | * | 11/1973 | Elston ................ A01M 17/002 111/96 |
| 4,153,184 | A | * | 5/1979 | Parish et al. ........ A01M 9/0069 222/305 |
| 4,614,160 | A | * | 9/1986 | Curlett .................... A01C 5/02 111/96 |
| 5,429,305 | A | * | 7/1995 | Munsey ............. A01M 7/0003 239/152 |
| 2003/0061756 | A1 | * | 4/2003 | Lokey ................ A01M 25/006 43/42.06 |
| 2007/0199956 | A1 | * | 8/2007 | Cramer ................. G01F 11/22 222/368 |

* cited by examiner

US 11,793,188 B1

SYSTEMS AND METHODS FOR DISTRIBUTING GRANULAR MATERIALS

CROSS-REFERENCE TO RELATED APPLICATIONS

This application is a continuation of U.S. Pat. Application No. 15/870,931, filed Jan. 13, 2018, by Robert E. Azar, which claims the benefit of priority from U.S. Provisional Pat. Application 62/446,725, filed Jan. 16, 2017, by Robert E. Azar, both of which are incorporated by reference as if set forth herein in their entirety.

BACKGROUND

Field of the Invention

The invention relates generally to dispensing granular or powdered materials, and more particularly to systems and methods for dispensing and distributing measured amounts of these materials in a manner that is both convenient and comfortable for a user, as well as being safer in some cases because of the distance placed between the user and the material that is being dispensed. Additionally, the length of the extension may gives added distance between the dispensed material and feet and clothing that may otherwise be contaminated.

Related Art

Many people and animals have had the unfortunate experience of being bitten by ants. The bites of some species of ants, such as fire ants, may be particularly painful and in rare cases, deadly, so it is wise to avoid areas where they are found. It may be the case, however, that the ants can't simply be avoided. For example, if the ants are found in a person's yard, they are an inconvenience, and may present a danger to children or pets that play in the yard.

It is therefore common for people who find ants in their yards or on other property to take steps to eliminate them. These steps may include spreading suitable poisons or other materials on or around anthills in order to kill the ants and their colonies and to prevent them from spreading to other areas. For a homeowner, this typically means buying a container of Orthene® brand ant-killer or another suitable ant-killer from a garden or hardware store and manually sprinkling this material on the anthills.

This conventional manual process of trying to eliminate ants has several disadvantages, however. One disadvantage is that, while the ant-killing materials are intended to be distributed in measured amounts (typically one tablespoon per anthill), it is difficult, if not impossible, to accurately gauge the amount of the material that has been applied when the user is simply tipping the container over and pouring it on the ground. This is even more true when the user is swinging the container to try to distribute the material around the ant hill rather than pouring the material in one spot. As a result, most users are likely to apply much more of the material to the anthill than is directed by the manufacturer, which is a waste of the material and a waste of money.

Another disadvantage of conventional hand-distribution of ant-killing materials is that many people, in order to more accurately distribute the material on and around the ant hills, will bend over so that the container for the material is closer to the ground when the material is poured around the ant hill. While this helps the user to more accurately distribute the material, it is ergonomically troublesome. In other words, bending over to pour the material onto the ant hills may cause unnecessary strain on the user's back, knees, etc. While this may not be noticeable if there are only a few ant hills to be treated, treatment of larger areas that have many hills may cause the user to experience significant strain and discomfort. Additionally, if the user has to bend over to pour the material onto the ant hills, his or her face will be closer to the material, increasing the risk of accidentally inhaling or ingesting the material (for example, if a gust of wind blows the material toward the user when it is being poured).

It would therefore be desirable to provide improved means for distributing granular materials such as pesticides wherein one or more of these problems reduced or eliminated.

SUMMARY OF THE INVENTION

This disclosure is directed to systems and methods for distributing granular materials that solve one or more of the problems discussed above. Embodiments disclosed herein distribute a measured amount of a granular material into a controlled area. It should be noted that, while the exemplary embodiments herein are described in the context of distributing materials that kill ants, these and other embodiments may be used for other purposes as well, such as distributing fertilizer to potted plants. References herein to apparatus, components, methods, etc. should be construed in a manner consistent with these different uses.

One embodiment comprises a dispensing apparatus having a dispensing body, a handle and a handle extension which is coupled between the handle and the dispensing body. The dispensing body has a measuring container with a cavity in it, where the cavity has a known volume. The dispensing body also has a filling mechanism and a dispensing mechanism. The filling mechanism is coupled to the measuring container and is selectively activated to fill the cavity of the measuring container with a granular material. The dispensing mechanism is also coupled to the measuring container and is selectively activated to release the granular material from the cavity, thereby dispensing from the apparatus only the predetermined amount of the granular material that fills the cavity in the measuring container. The handle includes a trigger that is coupled to the filling mechanism and the dispensing mechanism via a linkage in the handle extension. Activation of the trigger selectively activates the filling mechanism and the dispensing mechanism.

In one embodiment, the dispensing apparatus includes a reservoir that is coupled to the dispensing body. The reservoir stores the granular material that is used to fill the cavity of the measuring container. The apparatus may include a feed tube that is coupled between the reservoir and the dispensing body so that when the filling mechanism is activated, the granular material from the reservoir passes through the feed tube and into the cavity of the measuring container. The granular material may simply be gravity-fed from the reservoir through the feed tube to the cavity of the measuring container. In one embodiment, the reservoir may be an off-the-shelf retail container which has, for example, a threaded opening for a reclosable lid, where the threaded opening is connected to an adapter at a top end of the feed tube.

In one embodiment, the measuring container is a rotating drum. When the filling mechanism is activated, the drum is positioned so that an opening in the drum is open to the reservoir, allowing the granular material to fill the cavity. When the dispensing mechanism is activated, the drum is positioned so that the opening in the drum is open to an outlet tube connected to the dispensing mechanism, allowing the granular material to be released from the cavity into the outlet tube. The linkage in the handle extension may be, for example, a rod that extends through the handle extension from the trigger to the drum, where activating the trigger moves the rod within the handle extension, and movement of the rod causes the drum to rotate. When the trigger is in a first, released position, the rod may be in a lowered position which causes the drum to be positioned so that the opening in the drum is open to the reservoir. When the trigger is in a second, squeezed position, the rod may be in a raised position which causes the drum to be positioned so that the opening in the drum is open to the outlet tube. The linkage in the handle extension may alternatively comprise a set of electrical conductors coupled between the trigger and a motor in the dispensing body. In this case, activating the trigger activates the motor in the dispensing body and thereby selectively activates the filling mechanism and the dispensing mechanism. For instance, when the trigger is in a first, released position, the motor may cause the cavity to be opened to the reservoir of the granular material, allowing the cavity to be filled, and when the trigger is in a second, squeezed position, the motor may cause the cavity to be opened to the outlet tube, allowing the granular material to be released from the cavity into the outlet tube.

In one embodiment, the outlet tube connected to the dispensing mechanism allows the granular material released from the cavity of the measuring container to simply be gravity-fed through the outlet tube. The outlet tube may have a spreader positioned at its lower end, so that at least a portion of the granular material that falls through the outlet tube is directed by the spreader away from an axis of the outlet tube. The outlet tube may also have a containment shroud positioned at the lower end of the tube, where the containment shroud prevents the portion of the granular material which is directed by the spreader away from the axis of the outlet tube from falling outside a desired area within the containment shroud. The containment shroud may, for example, be generally conical in shape.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
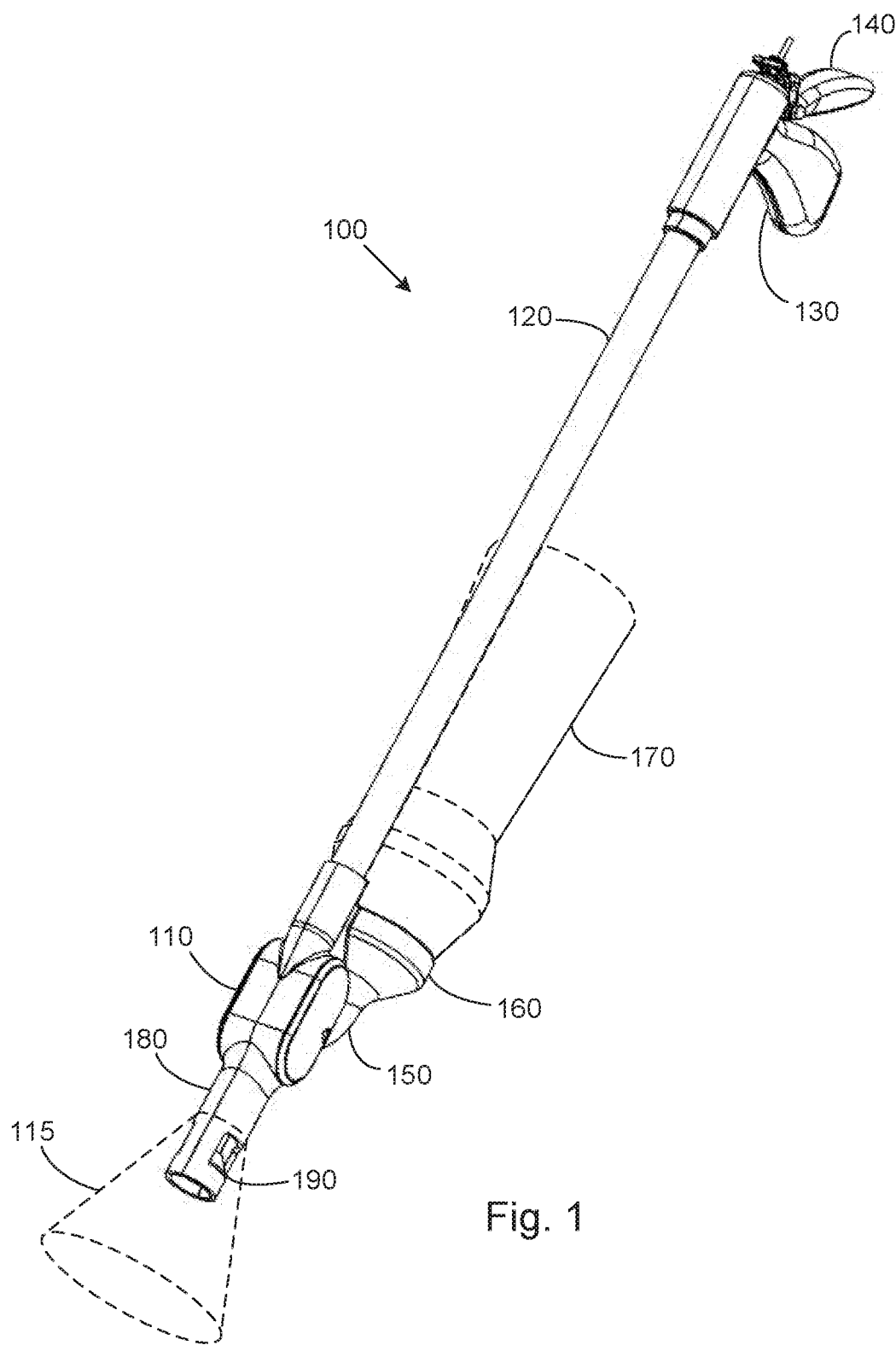
FIG. 1 is a diagram illustrating a perspective view of a wand for dispensing a granular material in accordance with one exemplary embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

The various embodiments of the present invention include apparatus and methods for distributing materials such as ant-killers, where it is desired to distribute a measured amount of a material into a controlled area. It should be noted that, while the exemplary embodiments herein are described in the context of distributing materials that kill ants, these and other embodiments may be used for other purposes as well. For instance, they may be used to distribute fertilizer to potted plants. References herein to apparatus, components, methods, etc. should be construed in a manner consistent with these different uses.

In one embodiment, an apparatus comprises an ant-killer wand that includes a metered dispensing mechanism. The wand has an extended handle that allows a user who is standing comfortably to position the dispensing mechanism near ground level for accurate application of the ant-killing material while keeping the material at a safe distance from the user's face. A trigger on the handle is linked to the dispensing mechanism so that the user can activate the dispensing mechanism via the trigger. A coupling allows an off-the-shelf container of the material to feed into the dispensing mechanism. A spreader at the outlet of the dispensing mechanism distributes the material into a desired pattern, rather than dropping it into a single spot or requiring the user to swing the device to distribute the material.

Figure 2:
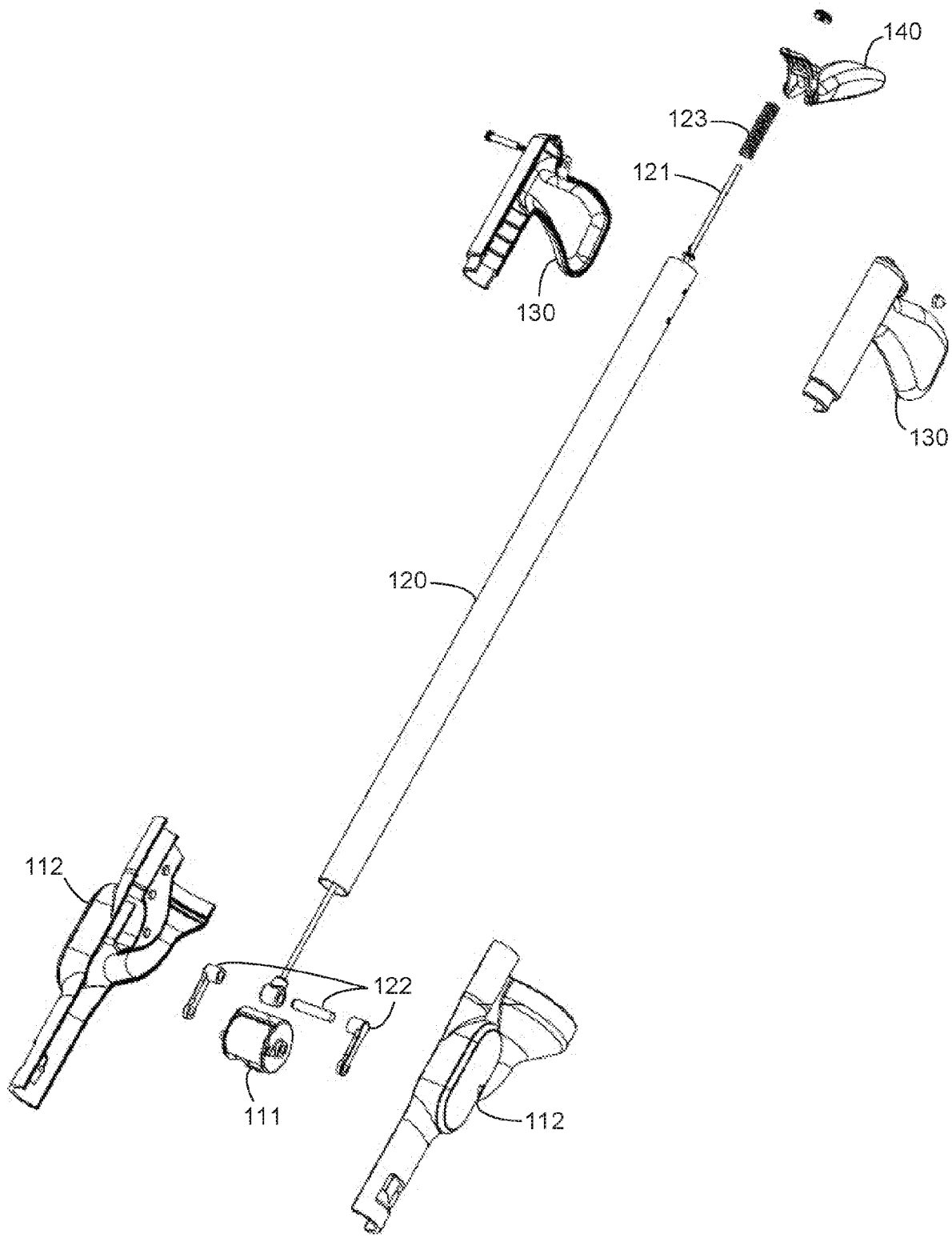
FIG. 2 is a diagram illustrating an exploded view of a wand for dispensing a granular material in accordance with the first exemplary embodiment.

Referring to FIGS. 1-3, an exemplary embodiment of the invention is shown. In this embodiment, the apparatus 100 is configured to distribute a pre-packaged granular ant-killing material. The apparatus may therefore be referred to as an ant-killing wand. (It should be noted that "granular", as used herein, should be construed to include materials having various particle sizes, including those that may be considered "powder".)

The apparatus has a dispensing body or dispensing mechanism 110 which receives the granular material from a pre-packaged container 170 via a feed mechanism 150. A threaded coupling 160 allows pre-packaged container 170 to be simply screwed onto feed mechanism 150. The dispensing mechanism 110 is coupled to a trigger 140 on handle 130. A trigger linkage passes through the interior of handle extension 120 to couple the trigger to the dispensing mechanism. When a user activates trigger 140, it pulls the linkage, which in turn activates the dispensing mechanism to dispense a measured amount of the granular material through outlet 180. At the lower end of the outlet tube is a spreader 190 which causes the granular material to be distributed over a broader area than if it simply fell from the outlet tube.

Referring to FIG. 2, an exploded view of ant-killing wand 100 is shown. It can be seen in this figure that the linkage between trigger 140 and dispensing mechanism 110 is a rod 121 that extends from the trigger to a cylindrical drum 111 of the dispensing mechanism. When trigger 140 is squeezed against handle 130, it pulls a proximal end of rod 121 toward the handle. The distal end of rod 121 is attached to a connector 122 that pivots on the sides of drum 111, so that when the rod is pulled toward the handle, connector 122 causes drum 111 to rotate within the housing 112 of dispensing mechanism 110. When the trigger is released, a spring 123 returns the trigger to its original rest position.

Figure 3A:
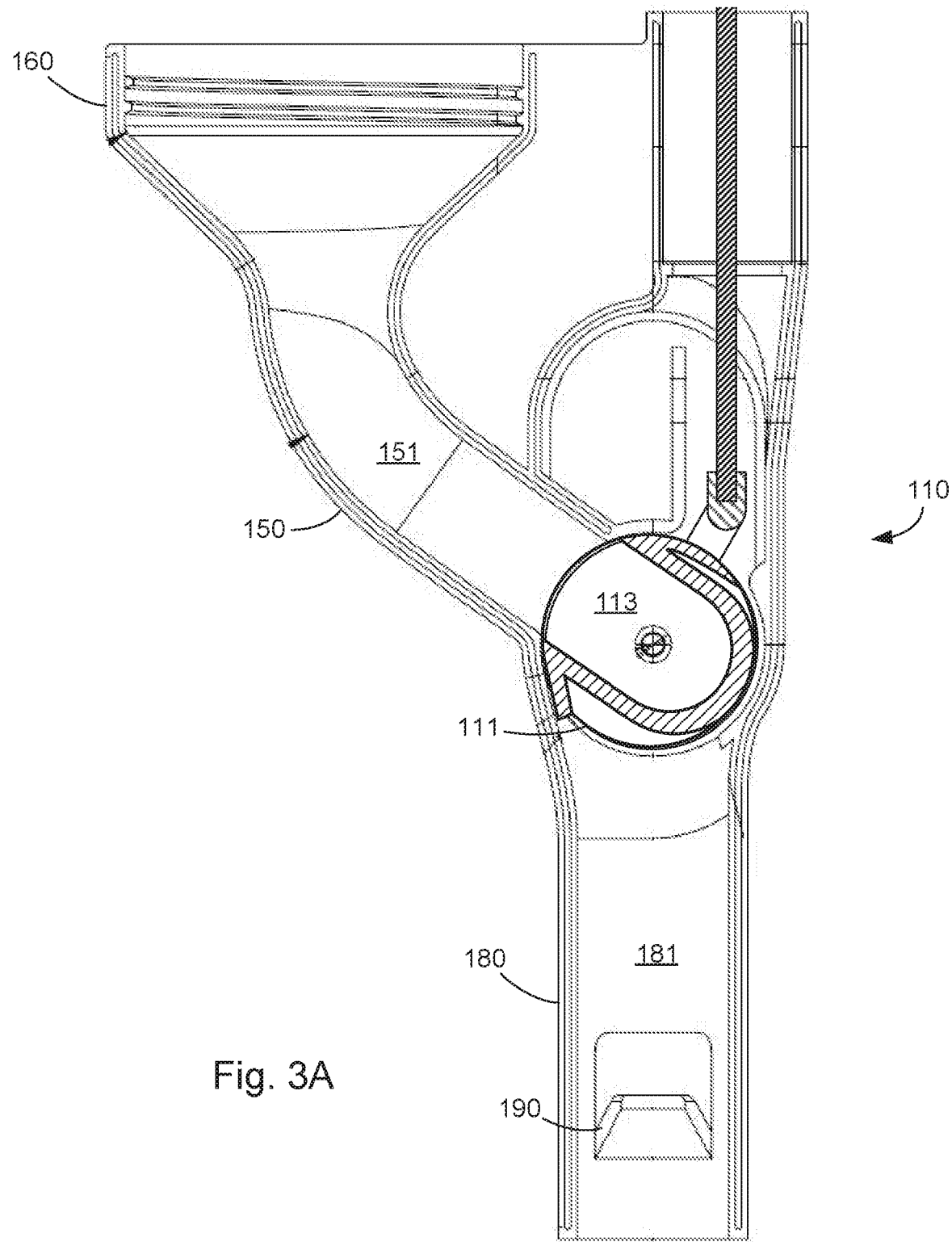
FIG. 3A is a cutaway view of the dispensing body of the first exemplary embodiment with the drum in position to be filled from a reservoir.
Figure 3B:
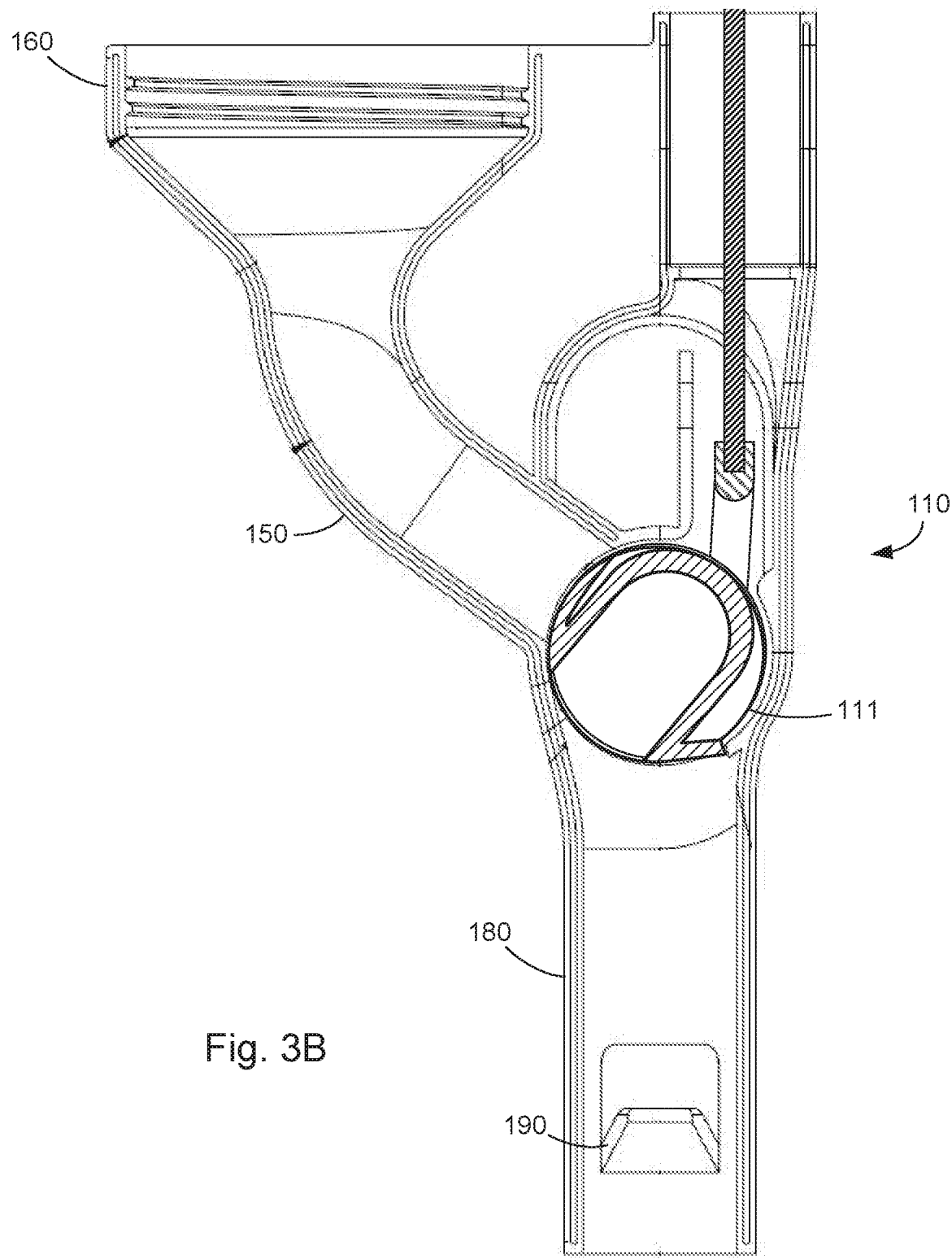
FIG. 3B is a cutaway view of the dispensing body of the first exemplary embodiment with the drum in position to release its contents to be output from the apparatus.

Referring to FIGS. 3A and 3B, the internal components of dispensing mechanism 110 are shown. When linkage rod 121 is in its rest position (when the trigger is not being squeezed), cylindrical drum 111 is positioned so that a cavity 113 in the drum faces the feed tube 151 of feed mechanism 150 (see FIG. 3A). This upward-facing or loading position of the drum allows granular material from the storage container to fall (via gravity) through feed tube 151 and into the cavity until the cavity is filled. When trigger 140 is squeezed and linkage rod 121 (and connector 122) is pulled upward, cylindrical drum 111 is rotated (counterclockwise in FIGS. 3A and 3B) to a downward-facing or dispensing position as shown in FIG. 3B. When drum 111 is rotated, the upper side (114) of the drum closes off the lower end of feed tube 151, and cavity 113 faces outlet tube 181, allowing the granular material in the cavity to fall (by gravity) out of the cavity, downward through the outlet tube. In one embodiment, a spreader 190 is positioned at the lower end of the outlet tube so that the granular material hits the spreader and is distributed outward, away from the axis of the tube.

Cavity 113 is designed to hold a predetermined volume of material to be distributed through the outlet tube each time the trigger is squeezed. In one embodiment, the drum is replaceable, so that the user can choose the amount of material to be dispensed. The originally-installed drum may have a cavity volume that is commonly used (e.g., one tablespoon). If, however, a user wishes to do so, the original drum can be replaced with a drum that has a different volume. For example, if the user is dispensing an ant-killing material for which the manufacturer's instructions direct that one-half tablespoon should be sprinkled on each ant hill, the user can install a drum that has a one-half tablespoon cavity. In one alternative embodiment, the drum is not replaceable, but it has a replaceable insert that determines the volume of the cavity. In another alternative embodiment, a movable component extends into the cavity by an amount that is adjustable, thereby occupying an adjustable portion of the cavity's volume, leaving the remaining volume to be filled with the granular material.

While the embodiment of FIGS. 1–3B uses a rod 121 and connector 122 to rotate drum 111, alternative embodiments may use other mechanisms. For instance, in one embodiment, the drum may be rotated by an electric motor. The motor may be electrically connected to a switch coupled to trigger 140, so that when the trigger is squeezed, the motor is actuated to rotate the drum from the loading position to the dispensing position. When the trigger is released, the drum returns to the loading position. It should be noted that alternative embodiments may use measuring and dispensing mechanisms other than the drum shown in the figures. For example, the rotating drum may be replaced by a stationary container which has a first opening that can be selectively opened or closed to fill the container with the granular material and a second opening that can be selectively opened or closed to empty the granular material from the container.

When drum 111 is rotated to the dispensing position and the granular material is dispensed to the outlet tube, the material falls onto spreader 190. While the spreader is not required in all embodiments, it is designed to divert the material away from the axis of the outlet tube and thereby spread the material. In the absence of the spreader, the granular material would, in most cases, fall into a relatively small area. If the ant-killing wand is not properly positioned, this could result in the granular material being ineffectively distributed (e.g., to a small are on one side of an ant hill). Because the spreader causes the granular material to be distributed over a larger area, the positioning of the ant-killing wand may be more forgiving. Consequently, the spreader is included in preferred embodiments.

In one embodiment, a containment shroud 115 (shown by a dashed line in FIG. 1) is attached to the outlet tube above the openings of the spreader. In this embodiment, the shroud is generally conical in shape. The containment shroud limits the area over which the granular material is distributed. This may be useful to limit the distribution of the granular material. For example, when the device is used on a windy day, the containment shroud can prevent the wind from blowing the granular material away from the desired area. The ant-killing wand could be positioned so that the cone is over an ant hill with its lower edge touching, or nearly touching, the ground. The granular material would then be spread within the area covered by the cone, but not outside this area.

In one embodiment, coupling 160 is threaded to accept an off-the-shelf, retail container of the granular material, such as may be purchased at a store. In the case of materials such as ant poisons, this avoids any need to transfer these poisons from the containers in which they were purchased to a separate container on the ant-killing wand. The device thereby makes it safer to use the poison. Since off-the-shelf containers may have different diameters, thread pitches, etc., adapters may be provided to enable these containers to be attached to coupling 160. Each adapter would have threads (or other means of connecting it to coupling 160) on one side, and threads or other means to connect the adapter to the corresponding off-the-shelf container.

The embodiments described above are intended to be illustrative of the invention, rather than limiting. Numerous variations of the embodiments' components may be implemented without departing from the scope of the invention as claimed below. For instance, as noted above, the trigger and linkage may use electrical or mechanical means to activate the filling and dispensing mechanisms. Similarly, the filling and dispensing mechanisms may use alternative structures, such as a stationary cavity that has separate filling and dispensing ports which can be alternately opened and closed to fill and then empty the cavity. Still other variations will be apparent to those of skill in the art based on the present disclosure.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments.

Many variations, modifications, additions and improvements to the embodiments described above are possible. It is contemplated that these variations, modifications, additions and improvements fall within the scope of the invention as detailed within the present disclosure.

What is claimed is:

1. A dispensing apparatus comprising:
   a dispensing body;
   a handle; and
   a handle extension coupled between the handle and the dispensing body;
   wherein the dispensing body includes
      a measuring container having a cavity therein, wherein the cavity has a predetermined volume,
      a filler which is coupled to the measuring container and is selectively activated to fill the cavity of the measuring container with a granular material, and
      a dispenser which is coupled to the measuring container and is selectively activated to release the granular material from the cavity of the measuring container, thereby dispensing only a predetermined amount of the granular material from the apparatus;
   wherein the handle includes a trigger that is coupled to the dispenser via a linkage positioned in a space in the handle extension which is physically separated by the measuring container from the granular material to prevent the granular material from entering the space in the handle extension, wherein activation of the trigger selectively activates the filler and the dispenser.

2. The dispensing apparatus of claim 1, further comprising a reservoir coupled to the dispensing body, wherein the granular material is stored in the reservoir prior to filling the cavity of the measuring container.

3. The dispensing apparatus of claim 2, further comprising a feed tube coupled between the reservoir and the dispensing body, wherein when the filler is activated, the granular material from the reservoir passes through the feed tube and into the cavity of the measuring container.

4. The dispensing apparatus of claim 3, wherein the granular material is gravity-fed from the reservoir through the feed tube and into the cavity of the measuring container.

5. The dispensing apparatus of claim 2, wherein the reservoir comprises an off-the-shelf retail container, wherein the off-the-shelf retail container has a threaded opening, wherein the threaded opening of the off-the-shelf retail container is connected to an adapter at a top end of a feed tube, wherein the granular material from the off-the-shelf retail container is gravity-fed through the feed tube to the cavity of the measuring container when the filler is activated.

6. The dispensing apparatus of claim 2, wherein the measuring container comprises a rotating drum, wherein when the filler is activated, the drum is positioned so that an opening in the drum is open to the reservoir, allowing the granular material to fill the cavity, and wherein when the dispenser is activated, the drum is positioned so that the opening in the drum is open to an outlet tube connected to the dispenser, allowing the granular material to be released from the cavity into the outlet tube.

7. The dispensing apparatus of claim 6, wherein the linkage in the handle extension comprises a rod that extends through the handle extension from the trigger to the drum, wherein activating the trigger moves the rod within the handle extension, and wherein movement of the rod causes the drum to rotate.

8. The dispensing apparatus of claim 7, wherein when the trigger is in a first, released position, the rod is in a lowered position which causes the drum to be positioned so that the opening in the drum is open to the reservoir, and when the trigger is in a second, squeezed position, the rod is in a raised position which causes the drum to be positioned so that the opening in the drum is open to the outlet tube.

9. The dispensing apparatus of claim 1, further comprising an outlet tube connected to the dispenser, wherein when the dispenser is activated the granular material released from the cavity of the measuring container is gravity-fed through the outlet tube.

10. The dispensing apparatus of claim 9, further comprising a spreader positioned at a lower end of the outlet tube, wherein the granular material which is released from the cavity of the measuring container is gravity-fed through the outlet tube, and wherein at least a portion of the granular material is directed by the spreader away from an axis of the outlet tube.

11. The dispensing apparatus of claim 10, further comprising a containment shroud positioned at the lower end of the outlet tube, wherein the containment shroud prevents the portion of the granular material which is directed by the spreader away from the axis of the outlet tube from falling outside a desired area within the containment shroud.

12. The dispensing apparatus of claim 11, wherein the containment shroud is generally conical in shape.

13. A dispensing apparatus comprising:
    a dispenser body;
    a handle; and
    a handle extension coupled between the handle and the dispenser body;
    wherein the dispenser body includes a measuring container having a cavity therein, wherein the cavity has a known volume, wherein the cavity of the measuring container is changeable to vary the volume of the cavity;
    wherein the handle includes a trigger that is coupled to the measuring container via a linkage in the handle extension, wherein the measuring container is selectively activated by the trigger to alternately fill the cavity of the measuring container with a granular material and release the granular material from the cavity of the measuring container, wherein the linkage is positioned in a space in the handle extension which is physically separated by the measuring container from a feed path through which the granular material flows, the measuring container preventing the granular material from entering the space in the handle extension.

14. The dispensing apparatus of claim 13, wherein the measuring container comprises a rotating drum, wherein when the measuring container is activated to be filled, the drum is positioned so that an opening in the drum is open to a reservoir containing the granular material, allowing the granular material to fill the cavity, and wherein when the measuring container is activated to release the granular material, the drum is positioned so that the opening in the drum is open to an outlet tube, allowing the granular material to be released from the cavity of the measuring container into the outlet tube.

15. The dispensing apparatus of claim 14, wherein the drum comprises a first drum in which the cavity has a first volume, wherein the drum is replaceable with a second drum in which the cavity has a second volume which is different from the first volume.

* * * * *